United States Patent
Dallos, Jr. et al.

(10) Patent No.: US 8,443,483 B2
(45) Date of Patent: May 21, 2013

(54) WIPER BLADE FOR VEHICLE WINDOW WIPER

(75) Inventors: Robert Dallos, Jr., Canton, MI (US); Mark K Denison, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 167 days.

(21) Appl. No.: 12/871,066

(22) Filed: Aug. 30, 2010

(65) Prior Publication Data
US 2012/0047674 A1    Mar. 1, 2012

(51) Int. Cl.
*B60S 1/38*    (2006.01)
(52) U.S. Cl.
USPC .......................................... 15/250.48; 15/245
(58) Field of Classification Search
USPC ....................................... 15/250, 245, 250.48
IPC ....................................................... B60S 001/38
See application file for complete search history.

(56) References Cited

U.S. PATENT DOCUMENTS

| | | | | |
|---|---|---|---|---|
| 4,103,385 A | * | 8/1978 | Porter | 15/250.48 |
| 4,638,525 A | * | 1/1987 | Sugita et al. | 15/250.48 |
| 4,716,618 A | * | 1/1988 | Yasukawa et al. | 15/250.48 |
| 5,107,563 A | * | 4/1992 | Zimmerman et al. | 15/250.48 |
| 5,716,699 A | * | 2/1998 | Reo | 428/325 |
| 6,004,659 A | * | 12/1999 | Leutsch et al. | 428/212 |
| 6,077,592 A | * | 6/2000 | Azuma et al. | 428/192 |
| 6,311,364 B1 | * | 11/2001 | Reo | 15/250.48 |
| 7,028,367 B2 | * | 4/2006 | Sharabura et al. | 15/250.001 |
| 2003/0229961 A1 | * | 12/2003 | Barnett | 15/250.48 |
| 2003/0233722 A1 | * | 12/2003 | Sawamura et al. | 15/245 |
| 2004/0148728 A1 | * | 8/2004 | Vogt et al. | 15/250.48 |
| 2004/0237229 A1 | * | 12/2004 | Hiruma et al. | 15/51 |
| 2008/0271277 A1 | * | 11/2008 | Mizote et al. | 15/250.48 |
| 2010/0146728 A1 | * | 6/2010 | Sharabura et al. | 15/250.48 |

FOREIGN PATENT DOCUMENTS

| | | |
|---|---|---|
| DE | 102007012924 A1 | 9/2008 |
| DE | 102008041322 A1 | 2/2010 |
| DE | 102009003095 A1 | 11/2010 |
| EP | 1249280 A2 | 10/2002 |

* cited by examiner

*Primary Examiner* — Joseph J Hail
*Assistant Examiner* — Marc Carlson

(57) ABSTRACT

A wiper blade for use on a vehicle window comprises a blade hinge made of a hydrophobic, elastomeric material, a wiping lip and a blade body. The wiping lip has a tip that contacts the vehicle window, a wiping lip base adjoining the blade hinge, and a tapered portion extending between the tip and the wiping lip base. The wiping lip base is made of a hydrophobic, elastomeric material and a majority of the tapered portion is made of an elastomeric material that is not hydrophobic. The blade body includes a main body portion configured to secure a wiper arm thereto, and a base portion adjoining the main body portion and the blade hinge. The base portion is made of a hydrophobic, elastomeric material and the main body portion is made of an elastomeric material that is not hydrophobic.

8 Claims, 1 Drawing Sheet

WIPER BLADE FOR VEHICLE WINDOW WIPER

BACKGROUND OF INVENTION

The present invention relates generally to window wipers used to clean vehicle windows and more particularly to wiper blades used in window wipers.

Window wipers used to clean vehicle windows tend to have difficulty adequately cleaning the windows under certain driving conditions. For example, in cold weather driving conditions, a hinge area of a wiper blade may fill with water and freeze. This ice prevents the hinge from properly allowing the wiping lip to flip at the reversal point in the wiper motion. This prevented flipping may cause the blade to chatter as it moves across the window, limiting the blade's ability to clear water and snow from the window.

In an attempt to address this concern, some have made the wiper blade entirely out of silicone or hydrophobic rubber, or have coated the entire wiper blade in these materials. However, silicone and other of the hydrophobic materials used have other drawbacks that make them less desirable when used to make the wiper blade.

SUMMARY OF INVENTION

An embodiment contemplates a wiper blade for use on a vehicle window comprising a blade hinge made of a hydrophobic, elastomeric material, a wiping lip and a blade body. The wiping lip has a tip that contacts the vehicle window, a wiping lip base adjoining the blade hinge, and a tapered portion extending between the tip and the wiping lip base. The wiping lip base is made of a hydrophobic, elastomeric material and a majority of the tapered portion is made of an elastomeric material that is not hydrophobic. The blade body includes a main body portion configured to secure a wiper arm thereto, and a base portion adjoining the main body portion and the blade hinge. The base portion is made of a hydrophobic, elastomeric material and the main body portion is made of an elastomeric material that is not hydrophobic.

An embodiment contemplates a method of forming a wiper blade for use on a vehicle window, the method comprising the steps of: forming a blade hinge, a wiping lip base of a wiping lip and a base portion of a blade body of a hydrophobic, elastomeric material to form a hinge recess having surfaces made of the hydrophobic, elastomeric material; forming a main body portion of the blade body adjoining the base portion, the main body portion being made of an elastomeric material that is not hydrophobic; forming a tapered portion of the wiping lip adjoining the wiping lip base, the tapered portion being made mostly of an elastomeric material that is not hydrophobic; and forming a wiping tip of the wiping lip adjoining the tapered portion, wherein the wiping tip is configured to engage a vehicle window.

An advantage of an embodiment is that the hydrophobic properties of the of the blade hinge and materials forming the hinge recess will improve water repelling in this area, which lowers the potential for ice buildup in the hinge area. Avoiding ice buildup in the hinge area allows for a smoother reversal action as the blade is pivoted back and forth on the window, which, in turn, allows for better wipe quality. The use of a silicone rubber for the hinge will also assist in keeping the hinge soft and flexible in low and higher temperature operating conditions. The use of other materials in the non-hinge area of the blade improves the overall durability of the wiper blade.

DETAILED DESCRIPTION

Figure 1:
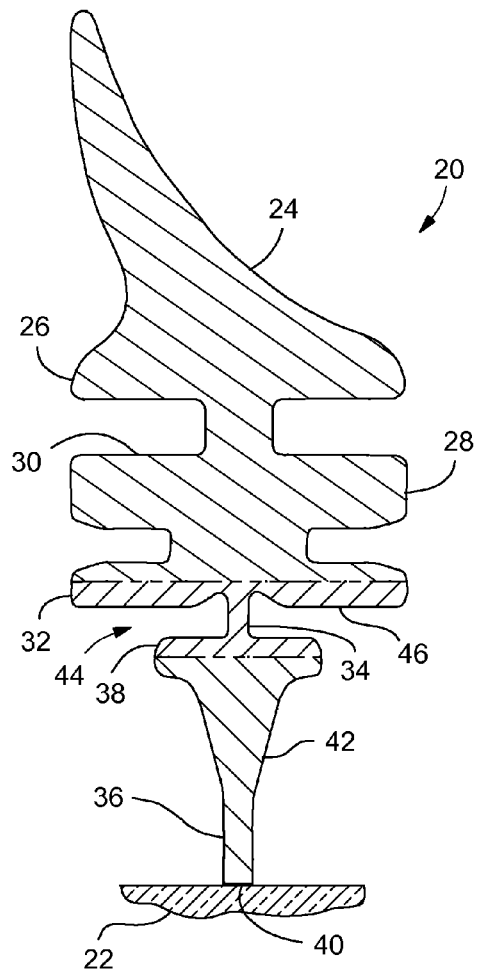
FIG. 1 is a schematic, cross section view of a wiper blade according to an embodiment.

FIG. 1 shows a wiper blade 20 located against a vehicle window 22. The window 22 may be, for example, a windshield or a rear window of a vehicle. The wiper blade has a blade body 24, with a main body portion 26 that includes wiper arm securement flanges 28 and recesses 30 for securing the wiper blade 20 to a wiper arm (not shown) that is pivotally secured to the vehicle. The blade body 24 also includes a base portion 32 that is adjacent to a blade hinge 34, which is designed to flex as the blade 20 is pivoted back and forth on the window 22.

Extending from the blade hinge 34 is a wiping lip 36. The wiping lip 36 is somewhat triangular in cross section, having a wide wiping lip base 38 adjacent to the blade hinge 34, a tapered portion 42 and a narrow tip 40 that contacts the window 22.

The wiping lip base 38, blade hinge 34 and blade body base portion 32 are all formed from a hydrophobic, elastomeric material, such as, for example silicone rubber. These portions made of the hydrophobic, elastomeric material have surfaces 46 that define the recess formed at the blade hinge 34. By having material with water repelling properties in the hinge recess 44, water is less likely to build up in this area, resulting in less potential for ice buildup in cold weather driving conditions. Avoiding ice buildup in the hinge recess allows for smoother reversal action of the blade 20 on the window 22, permitting better wipe quality.

The other portions of the wiper blade 20, the main body portion 26 (including the wiper arm securement flanges 28 and recesses 30) and the tapered portion 42 and tip 40 of the wiping lip 36, are made of other elastomeric materials such as, for example, natural rubber or chloroprene rubber. While not hydrophobic materials, natural rubber and chloroprene rubber allow for increased durability of the main body portion 26 and tapered portion 42 relative to such portions being made of silicone rubber.

The wiper blade 20 may be formed by a multi-shot molding or a co-extrusion fabrication process. As such, the wiper blade 20 may be formed as a single, monolithic piece. The phantom lines in FIGS. 1 and 2 indicate the general location where the material of the wiper blade 20 changes from one to another (even though the blade 20 is a monolithic piece).

Figure 2:
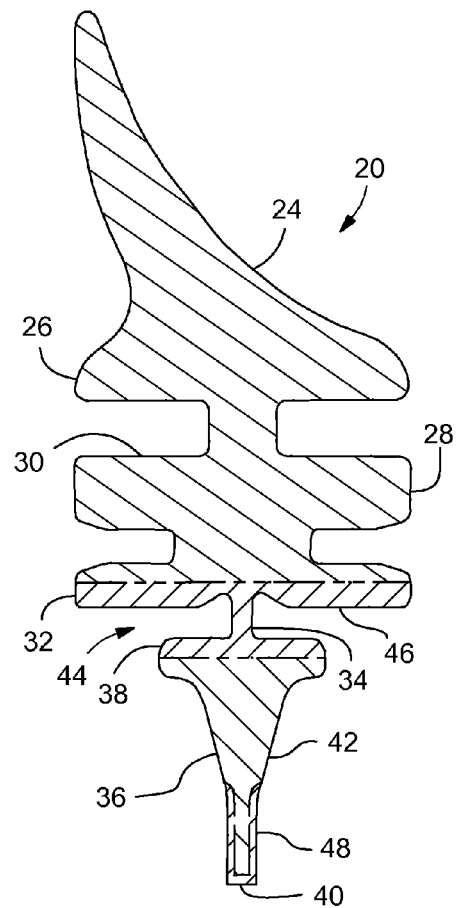
FIG. 2 is a schematic, cross section view similar to FIG. 1, but illustrating another embodiment.

FIG. 2 illustrates another embodiment. Since this embodiment is similar to the first, similar element numbers will be used for similar elements, and the detailed description thereof will be omitted. In this embodiment, the blade body 24 is the same as the first, while the wiping lip 36 has changed somewhat.

The tip 40 and a portion 48 of the tapered portion 42 adjacent to the tip 40 are formed from a hydrophobic, elastomeric material, such as, for example silicone rubber. This, in effect, acts as a hydrophobic coating to reduce the chances of ice build-up on the tip 40 while still maintaining the improved durability of the base material in the tapered portion 42. The base material again may be, for example, natural rubber or chloroprene rubber.

While certain embodiments of the present invention have been described in detail, those familiar with the art to which this invention relates will recognize various alternative designs and embodiments for practicing the invention as defined by the following claims.

What is claimed is:

1. A wiper blade for use on a vehicle window comprising:
 a blade hinge made of a hydrophobic, elastomeric material;
 a wiping lip having a tip configured to contact the vehicle window, a wiping lip base adjoining the blade hinge, and a tapered portion extending between the tip and the wiping lip base, the wiping lip base being made of a hydrophobic, elastomeric material and a majority of the tapered portion being made of an elastomeric material that is not hydrophobic, and wherein the tip is made of a hydrophobic, elastomeric silicone rubber and a portion of the tapered portion adjoining the tip is made of a hydrophobic, elastomeric silicone rubber; and
 a blade body including a main body portion configured to secure a wiper arm thereto, and a base portion adjoining the main body portion and the blade hinge, the base portion being made of a hydrophobic, elastomeric material and the main body portion being made of an elastomeric material that is not hydrophobic.

2. The wiper blade of claim 1 wherein the blade hinge, the wiping lip base and the base portion of the blade body are made of silicone rubber.

3. The wiper blade of claim 2 wherein the tapered portion and the main body portion are made of natural rubber.

4. The wiper blade of claim 2 wherein the tapered portion and the main body portion are made of chloroprene rubber.

5. The wiper blade of claim 1 wherein the tapered portion and the main body portion are made of natural rubber.

6. The wiper blade of claim 1 wherein the tapered portion and the main body portion are made of chloroprene rubber.

7. The wiper blade of claim 1 wherein the main body portion is made of natural rubber and includes at least one wiper arm securement flange and at least one wiper arm securement recess.

8. The wiper blade of claim 1 wherein the blade hinge, the wiping lip base and the base portion of the blade body are made of silicone rubber and define a hinge recess.

* * * * *